Aug. 16, 1932.                W. V. HOWARD                1,871,885
                       TIER MECHANISM FOR HAYPRESSES
                      Filed Feb. 28, 1930      8 Sheets-Sheet 4
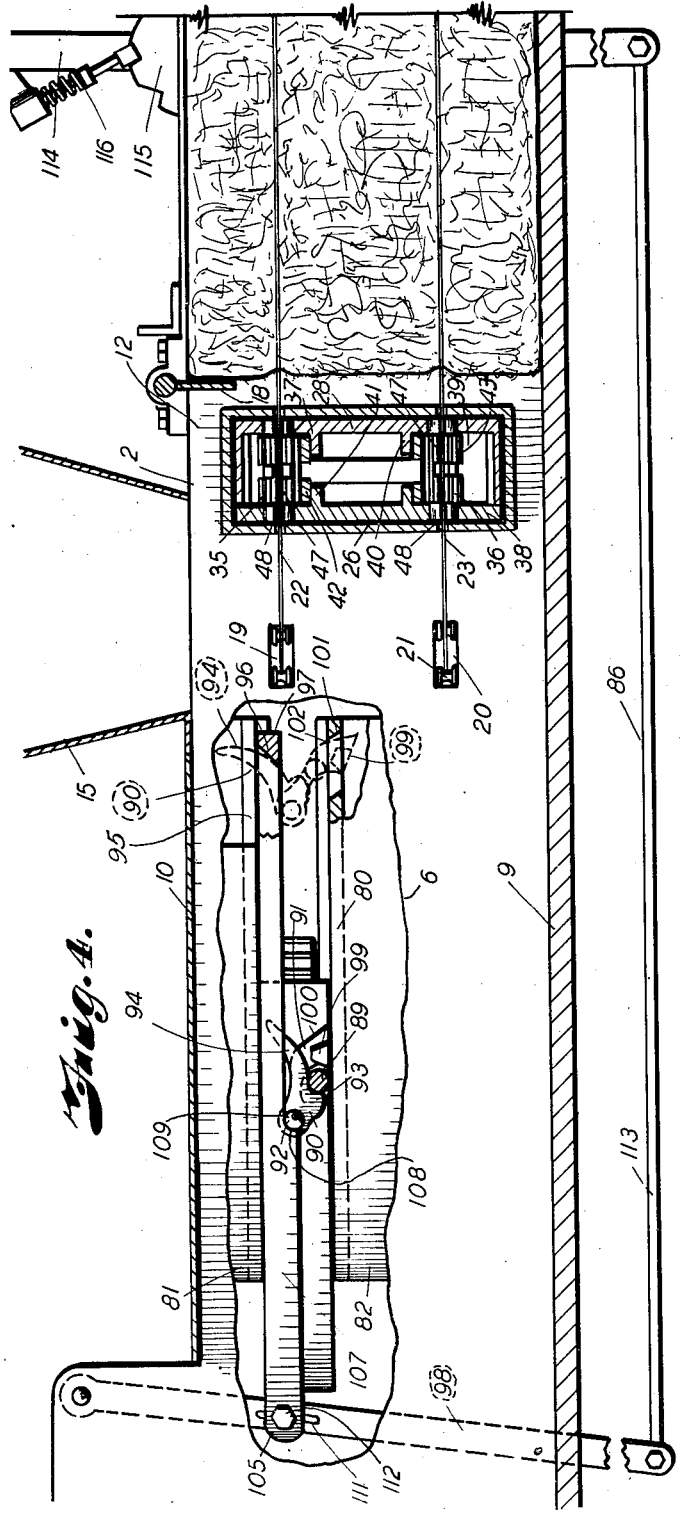
INVENTOR
Willis V. Howard
By  Arthur C. Brown
ATTORNEY Aug. 16, 1932. W. V. HOWARD 1,871,885
TIER MECHANISM FOR HAYPRESSES
Filed Feb. 28, 1930 8 Sheets-Sheet 5
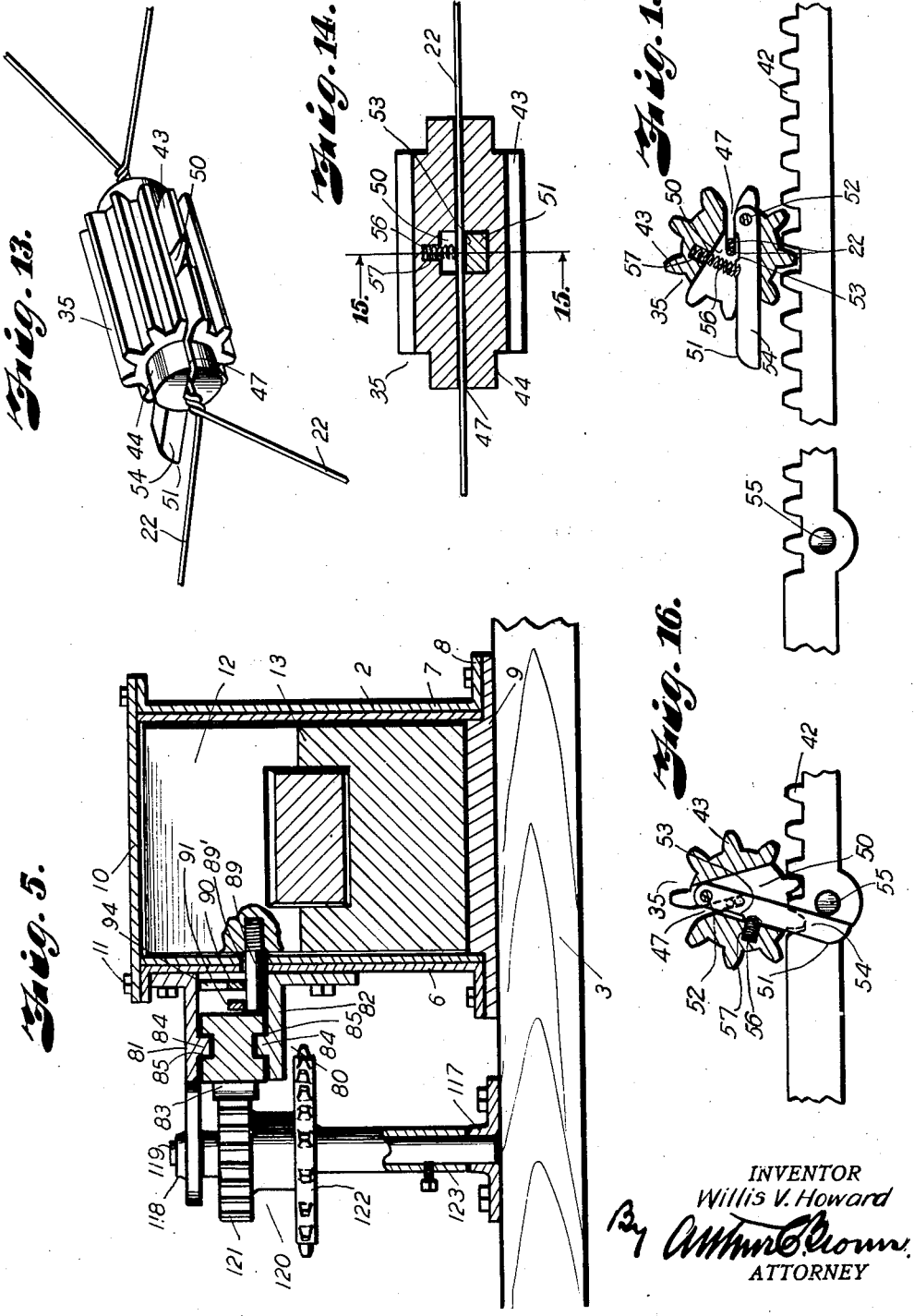
INVENTOR
Willis V. Howard
ATTORNEY

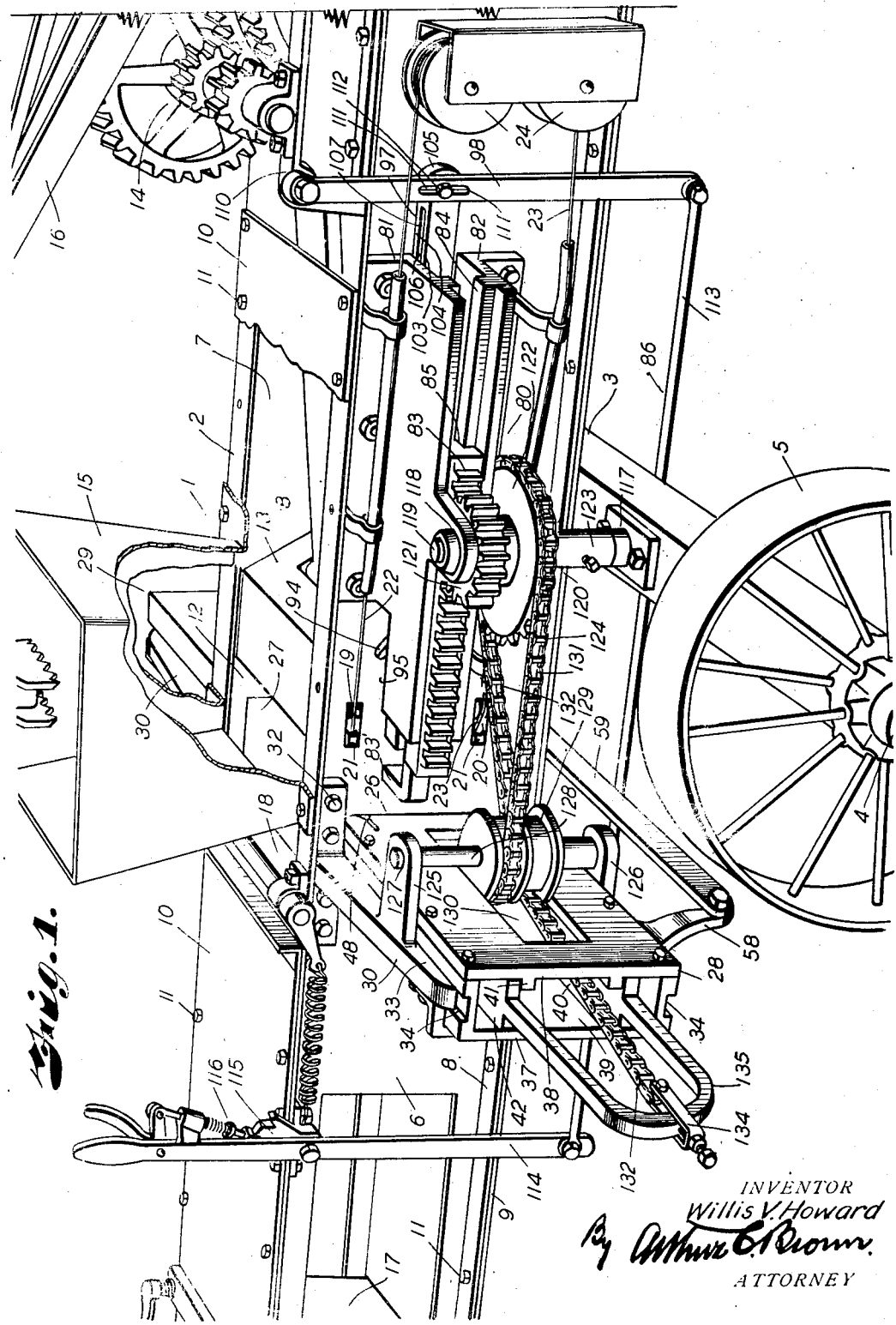

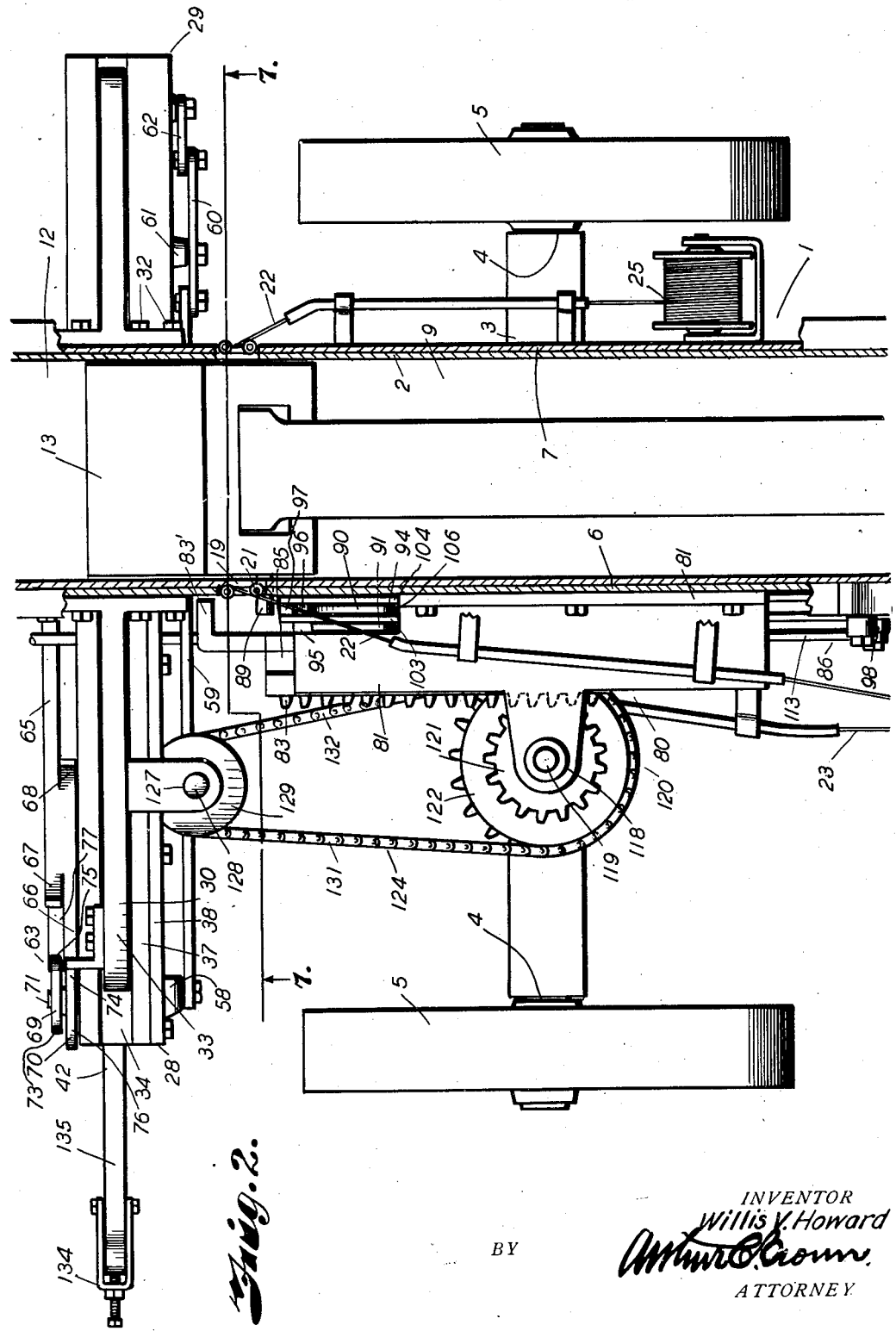

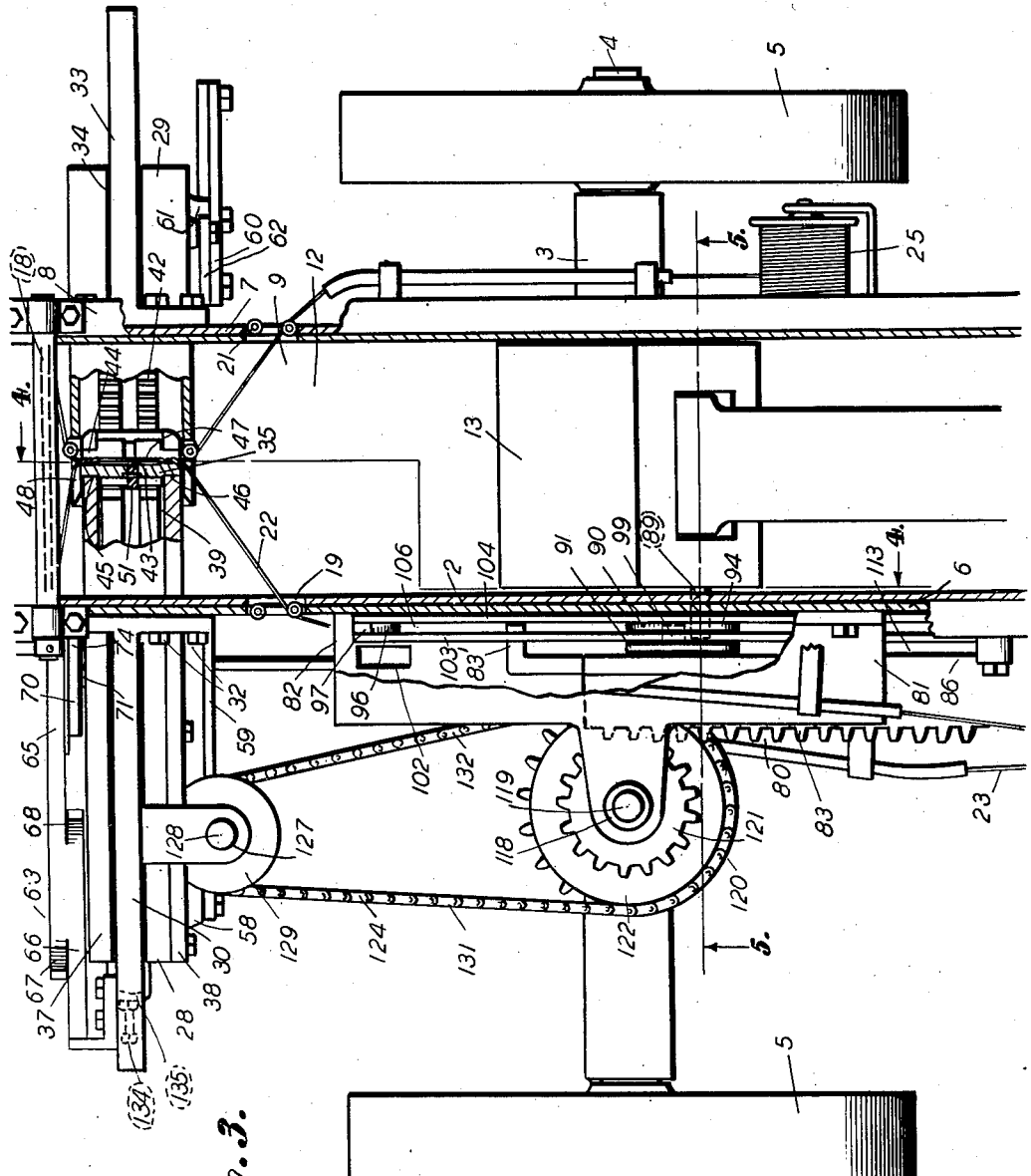

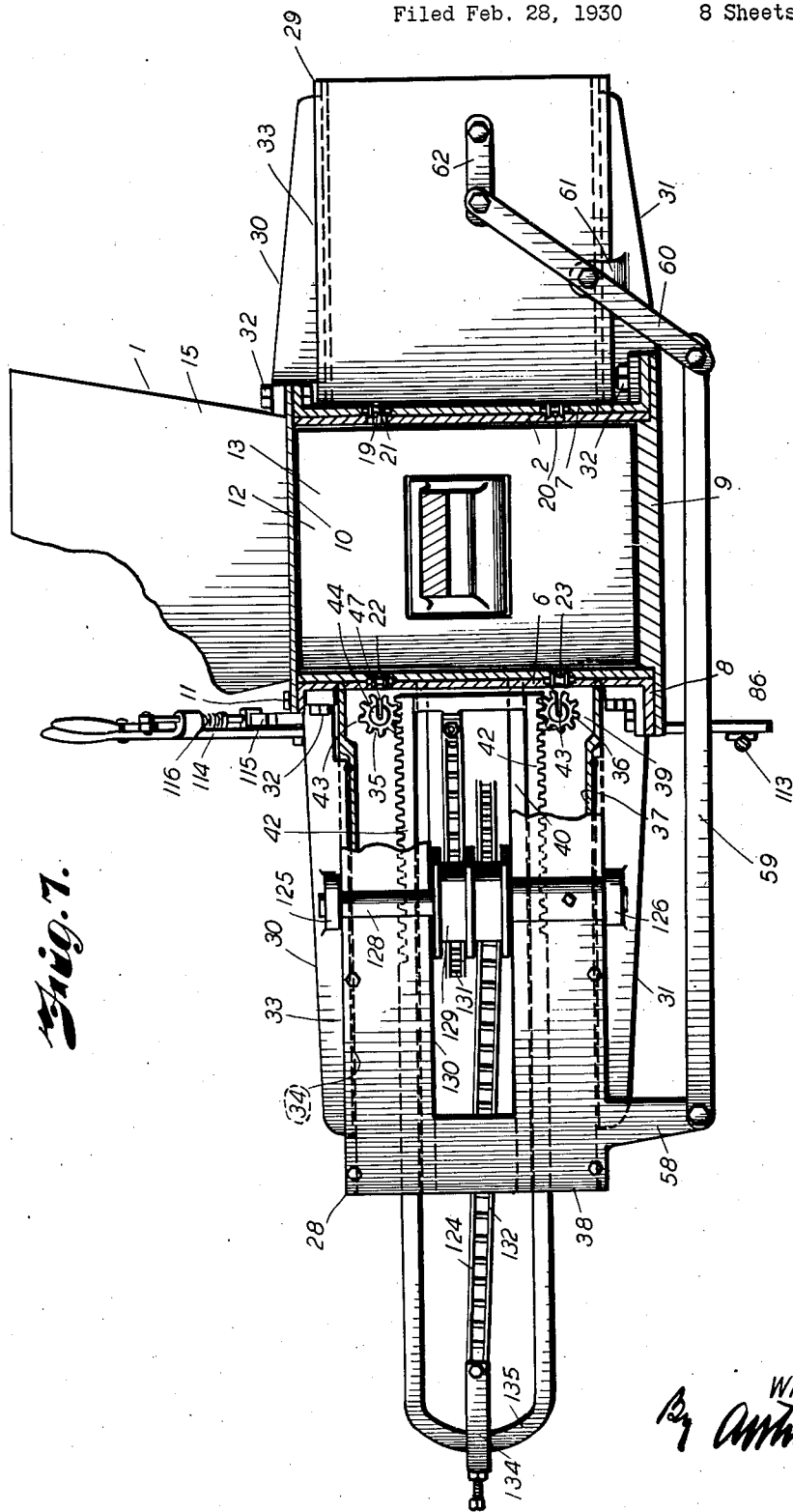

Aug. 16, 1932.  W. V. HOWARD  1,871,885
TIER MECHANISM FOR HAYPRESSES
Filed Feb. 28, 1930    8 Sheets-Sheet 7
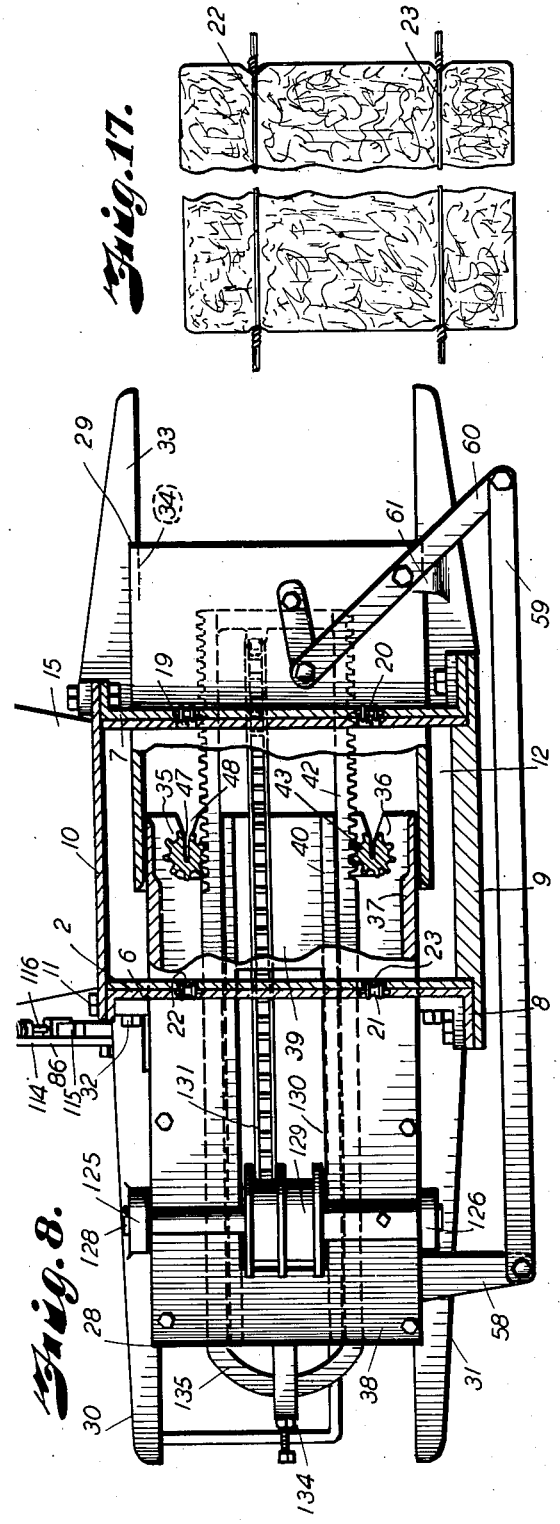
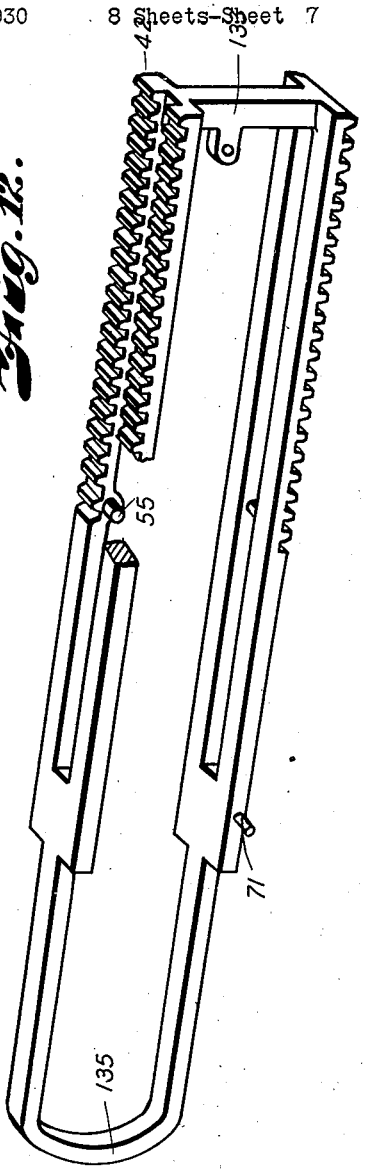
INVENTOR
Willis V. Howard
BY Arthur C. Brown
ATTORNEY

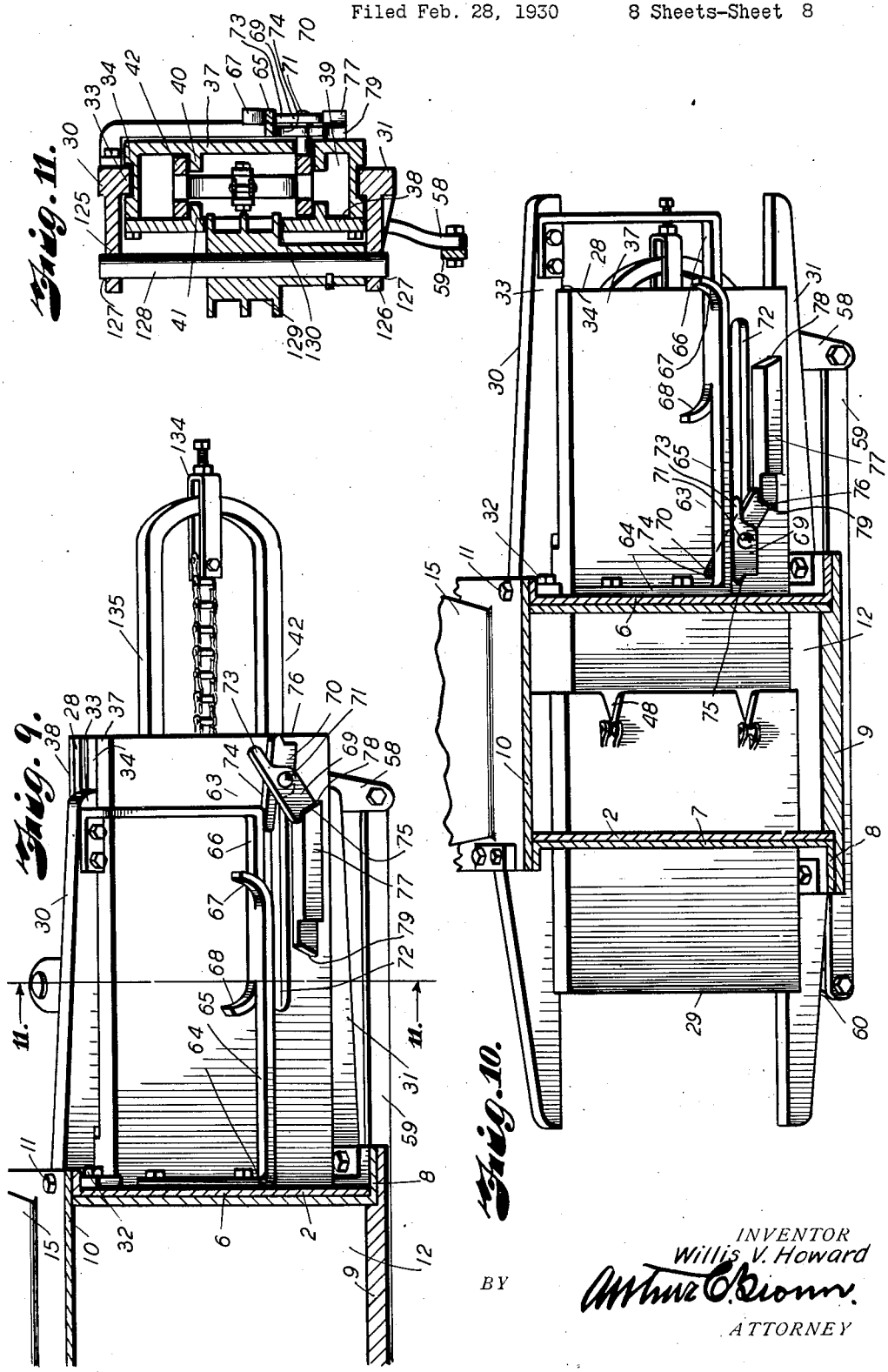

Patented Aug. 16, 1932

1,871,885

UNITED STATES PATENT OFFICE

WILLIS V. HOWARD, OF LEAVENWORTH, KANSAS

TIER MECHANISM FOR HAYPRESSES

Application filed February 28, 1930. Serial No. 432,133.

My invention relates to wire tying apparatus, and more particularly to apparatus of that character for tying bales of hay, straw or like material during the baling process, the principal object of the invention being to provide tying apparatus of simplified construction for tying strands of wire about a finished bale and connecting the strands preparatory for the next succeeding bale with one operation, thereby eliminating the necessity for dividing boards between the bales and rendering the apparatus highly efficient in operation.

A further object of the invention is to provide actuator means for operably connecting and timing the tying apparatus with relation to the plunger under control of manual control mechanism, thereby minimizing the possibility of injury to the operator and permitting the apparatus to be operated at will for producing bales of various lengths as may be desired.

In accomplishing these and other objects of the invention, I have provided improved details of structure, the preferred form of which is illustrated in the accompanying drawings, wherein:

Fig. 1 is a perspective view of my improved tying apparatus mounted on a baling machine.

Fig. 2 is a plan view of the baling machine partly broken away and showing the tying apparatus in normal retracted position.

Fig. 3 is a similar view showing the tying apparatus in advanced position for tying strands of wire about a finished bale.

Fig. 4 is a section on the line 4—4, Fig. 3, showing the actuator rack in advanced position, and the tier units with relation to the wire strands.

Fig. 5 is a transverse section on the line 5—5, Fig. 3, illustrating the mounting of the actuator rack and showing the pilot pin of the plunger for actuating the rack.

Fig. 6 is an enlarged detail perspective view of the actuator rack and the cam bar cooperating with the actuator pawls.

Fig. 7 is a transverse section on the line 7—7, Fig. 2, showing the needle mechanism in normal retracted position and partly broken away for better illustration of the parts.

Fig. 8 is a similar view showing the tier and threader needles telescoped in advanced position for combining the wire strands of a bale, and the tier rack advanced for actuating the tier units.

Fig. 9 is a perspective view of the rear side of the tier needle in normal position showing the cam mechanism for timing movement of the needle relative to the movement of the tier rack.

Fig. 10 is a similar view showing the tier and threader needles in advanced position.

Fig. 11 is a transverse section through the tier needle on the line 11—11, Fig. 9.

Fig. 12 is a detail perspective view of the tier rack.

Fig. 13 is a detail perspective view of the tier gear unit.

Fig. 14 is a central longitudinal section through the tier gear unit showing the through slot for receiving the strands of wire.

Fig. 15 is a transverse section on the line 15—15, Fig. 14, particularly illustrating the cutter for severing the strands of wire, and showing a portion of the rack for actuating the tier gear.

Fig. 16 is a similar view showing the cutter engaged with a stop pin on the rack and in position for severing the strands.

Fig. 17 is a side elevation view of a finished bale.

Referring in detail to the drawings:

1 designates a baling machine of conventional type including a casing portion 2 mounted on a suitable frame 3, including an axle 4 fitted with wheels 5 for portably supporting the machine.

The body portion 2 includes side plates 6 and 7 having longitudinal flanges 8 attached to a base plate 9 and to a cover plate 10 by bolts 11 for forming a bale chamber 12 fitted with a plunger 13 operably connected with gear mechanism 14 which may be driven from any suitable source of power (not shown).

Mounted on the casing 2 on the side flanges 8 is a hopper 15 through which hay, straw, cotton, or other baling material may be fed into the baling chamber by a feeder 16 and compressed by the plunger 13 against a removable head 17 at the rear end of the casing to form a bale which is restrained from return expansion by a bale retainer 18 spaced from the rear side of the hopper.

In adapting the baling machine for cooperation with the tying apparatus constituting my invention, the side plates 6 and 7 are provided with vertically spaced openings 19 and 20 below the hopper 15, fitted with rollers 21 for receiving paired strands of wire 22 and 23 from spools 24 and 25 on opposite sides of the casing, the upper and lower strands being adapted for tying with respective upper and lower strands from opposite sides of a finished bale as later described.

Located in the side plates 6 and 7 between the hopper 15 and bale retainer 18 are rectangular-shaped openings 26 and 27 aligning transversely across the casing 2 for receiving tubular needle members 28 and 29 having open ends, and adapted to move freely through the openings between their respective guide brackets 30 and 31, and to telescope within the casing 2, as shown in Fig. 8. The brackets 30 and 31 are fixed to the side plates 6 and 7 above and below the openings 26 and 27 by bolts 32, and include rail portions 33 slidably engaged in longitudinal grooves 34 in the top and bottom sides of the needle members, whereby the needle members are slidable transversely across the bale chamber 12 for projecting the strands of wire 22 and 23 about the ends of a bale, the needle member 28 being provided with vertically spaced tier units 35 and 36 at its inner end aligning with the wire strands 22 and 23 for tying the strands about a finished bale, as hereafter described.

The tier needle 28 includes a channel-shaped member 37 fitted with a side plate 38 forming a chamber 39, the members having opposed longitudinal guide rails 40 and 41 for supporting a rack 42, whereby the tier units 35 and 36 are actuated when the needles 28 and 29 are advanced to tying position. The tier units 35 and 36 are identical in construction, each including a gear member 43 having trunnions 44 mounted in aligning openings 45 and 46 (Fig. 3) in the forward end of the channel member 37 and the side plate 38, and provided with a through longitudinal slot 47 normally aligning with recesses 48 in the inner ends of the needles.

The recesses 48 are tapered outwardly for receiving and guiding the strands of wire into the slot 47 during inward movement of the needles, the slot being of proper width for retaining the strands in parallel relation therein during the tying operation.

Located centrally in the gear member 43 is a recess 50 (Fig. 14), fitted with a cutter 51 pivotally secured on a pin 52 and having a blade 53 movable across the slot 47, and an arm portion 54 cooperating with a pin 55 on the rack 42 for severing the wire strands 22 and 23 after completion of the tying operation. The cutter blade 53 is yieldingly retained in normal position at one side of the slot 47 by a spring 56 seated in a recess 57 in the gear and resting against the cutter edge of the blade.

The tier needle 28 and threader needle 29 are operable in unison by connecting means including a bracket 58 (Fig. 7), on the side plate 38 connected with a link 59 having its opposite end connected with the lower end of a lever 60 pivotally supported on a boss 61 projecting sidewardly from the guide bracket 31 at the opposite side of the machine. The upper end of the lever is connected with the threader needle 29 by a toggle link 62 so that inward movement of the tier needle 28 causes inward movement of the threader needle 29, the threader needle being slightly greater in cross section than the needle 28, thereby permitting the members to telescope when in advanced position for tying a bale.

The tier units 35 and 36 are operable in timed relation with the needle members so that the needle members complete their inward movement before the tying operation is begun, and in accomplishing this result the tier rack 42 is movable relative to the needle 28 under control of cam mechanism 63 (Fig. 9). The cam mechanism 63 includes a bracket 64 mounted on the side plate 6 and on the bracket 30 and having laterally spaced rail portions 65 and 66 provided with upturned ends forming cam portions 67 and 68 cooperating with pawls 69 and 70. The pawls are mounted on a pivot pin 71 fixed on the tier rack 42 and slidable in a slot 72 located in the side wall of the needle 28 below the rails 65 and 66. The pawls 69 and 70 are provided with tail portions 73 and 74 respectively, for slidably engaging the rail portions 65 and 66 of the bracket 64 and with oppositely facing jaw portions 75 and 76 engageable with a boss 77 projecting from the side wall of the needle member 28 below the slot 72.

The jaw portion 75 of the pawl 69 is engageable with the outer end face 78 of the boss 77 for shifting the needle member 28 through the opening 26 into the bale chamber 12 and is releasable from the boss by the cam 67 for stopping inward movement of the needle and permitting continued movement of the rack 42 for actuating the tier units.

The tail portion 74 of the pawl 70 is engaged under the rail portion 66 during the inward movement of the needle 28 and is releasable by the cam 68 during inward movement of the rack 42 so that the jaw portion 76 of the pawl engages the inner end face 79 of the boss 77 for shifting the needle outwardly to normal position when the tier rack is withdrawn by actuator mechanism 80, presently described.

Located on the side plate 6 adjacent the hopper 15 are paired support brackets 81 and 82 extending longitudinally parallel with the flange 8, and spaced apart for receiving an actuator rack 83. The brackets are provided with guide rail portions 84 slidably engaging longitudinal grooves 85 in the rack which is reciprocable therein when operably connected with the baling plunger by manual control mechanism 86.

The control mechanism 86 includes a pilot pin 89 fixed in the plunger 13 and extending through a slot 89′ in the side plate 6 for cooperation with laterally spaced pawls 90 and 91 carried by the rack 83. The pawls 90 and 91 are pivotally mounted on a pin 92 secured in the back side of the rack 83, the pawl 90 being provided with a jaw portion 93 engageable with the pilot pin 89 and with a tail portion 94 extensible through a slot 95 at the rear end of the bracket 81, and engageable with the cam portion 96 of a slide bar 97, whereby the pawl may be lowered for engagement with the pin for moving the rack forwardly with the plunger when the bar is shifted by a manually operated lever 98.

The pawl 91 is provided with a boss 99 extending outwardly in spaced relation with the jaw portion 93 of the pawl 90 for engaging the opposite side of the pilot pin 89, whereby the rack 83 is shifted rearwardly during the rearward or compression stroke of the plunger 13, the rack being provided with an extension arm 83′ having an inturned end to supplement the pawl 91 and insure rearward movement of the rack 83 to its normal position. The pawl 91 is also provided with a cam face 100 engageable with a cam face 101 in an opening 102 of the support bracket 82 for actuating the pawl on its pivot and releasing the boss 99 from engagement with the pilot pin 89 simultaneous with the lifting of the pawl 90 by the cam 96 of the slide bar 97, whereby the pin may move freely between the pawls during reciprocation of the baling plunger for forming a bale.

The slide bar 97 (Fig. 6), includes a pair of parallel extending bars 103 and 104, spaced apart at one end by the cam 96 and at their opposite end by a head 105 to form a guideway 106 receiving the tail portion 94 of the pawl 90 for cooperation with the cam. The bar portion 104 is slidably engaged on the pin 89 between the pawls for guiding the slide bar, and the forward portions 107 of the bars are of increased width to form stop shoulders 108 engageable with a protruding portion 109 of the pivot pin 92 for restoring the slide bar to normal position as the rack 83 arrives at the forward limit of its stroke.

The lever 98 is pivoted at its upper end on the side frame 110 of the gear mechanism 14 and is provided with a slot 111 engaging a pivot stud 112 fixed in the head 105 of the slide bar 97. The lower end of the lever is pivotally connected with a rod 113 extending under the axle 4 and needle 28, and connected with a lever 114 pivotally supported on a stop segment 115, and having latch mechanism 116 for retaining the slide bar 97 in normal position whereby the pawl 90 is held in raised position out of the path of the pilot pin 89, as shown in Fig. 4, but which may be released by the operator and moved clockwise on its pivot for shifting the slide bar and lowering the pawl for engagement by the pilot pin 89 during the initial rearward or idle movement of the baling plunger.

Rotatably mounted in a bearing 117 on the axle 4 and in a vertically aligned bearing 118 on the guide member 81 is a shaft 119 fitted with a gear unit 120 including a gear portion 121 meshing with the rack 83, and a sprocket 122 supported below the rack by a sleeve portion 123, and fitted with a chain belt 124 for connection with opposite ends of the tier rack 42.

Located on the guide brackets 30 and 31 supporting the tier needle 28 are laterally extending arms 125 and 126 having bearing openings 127 (Fig. 11), journalling a shaft 128, and fixed on the shaft are idler pulleys 129 aligning with an elongated, rectangular-shaped opening 130 in the side plate 38 for movably supporting the portions 131 and 132 of the chain 124. The portion 131 of the chain is attached to the cross head 133 of the rack 42, and the portion 132 of the chain is attached to an adjustable connector yoke 134 on the extension bracket 135 of the rack so that forward movement of the actuator rack 83 causes clockwise rotation of the gear unit 120 and inward movement of the tier rack 42. Reverse movement of the rack 83 causes anti-clockwise rotation of the gear unit 120 and outward movement of the tier rack 42.

In using a baling machine equipped with my improved tier mechanism, the operation is as follows:

The baling plunger 13 is reciprocated in the baling chamber 12 and the material, such as hay, straw, or other material to be baled, is placed in the hopper 15 and fed into the baling chamber by the feeder 16. With each forward movement of the plunger the material is compressed in the chamber against the head at the rear end of the bale chamber, the operation being continued until a bale of desired length has been formed, whereupon the operator shifts the lever 114 clockwise on its pivot causing the lever 98 to be moved anti-clockwise on its pivot for shifting the slide bar 97 rearwardly and lowering the pawl 90 so that the jaw portion 93 lies in the path of the pilot pin 89.

During the initial forward stroke of the plunger 13 the pin 89 engages the jaw 93 of the pawl 90, causing the rack 83 to be moved forwardly in its support brackets 81 and 82 for rotating the gear 121 and sprocket 122 clockwise and causing the tier rack 42 to be moved inwardly, the pawl 69 on the rack engaging the boss 77 on the tier needle 28 so that the tier needle is moved inwardly by the tier rack, and the threader needle is moved inwardly through its leverage connection with the tier needle.

The strands of baling wire 22 and 23 extending about the bale and across the openings 26 and 27 of the casing are received in the recesses 48 of the needles during initial movement of the needles, and during the telescoping of the needles the strands from opposite sides of the bale are brought together in the slot 47 of the tire gear 43. The pawl 69 engages the cam 67 and is disengaged from the boss 77 for interrupting inward movement of the needle members, the bracket 58 and arm 126 serving as limit stops, as shown in Fig. 8.

The tier rack 42 continues its inward movement after the needles are in advanced position, thereby rotating the tier gears 43 and twisting the wire strands 22 and 23 at opposite ends of the gear about the finished bale and for one end of the next succeeding bale.

As the tier rack approaches the limit of its inward movement the stop pin 55 is engaged by the arm portion 54 of the cutter 51, causing pivotal movement of the cutter, the cutter blade 53 moving across the slot 47 for severing the wire strands and completing the tying operation.

As the plunger 13 starts its return rearward movement the pin 89 engages the boss 99 of the pawl 91 and moves the rack 83 rearwardly, and as the rack approaches the rearward limit of its movement the cam face 100 of the pawl engages the cam face 101 of the opening 102 in the guide bar 82, causing the pawl to be moved downwardly on its pivot and the stop boss to be disengaged from the pin, as shown in dotted lines in Fig. 4. Simultaneously with the movement of the pawl 91 into the opening 102, the tail portion 94 of the pawl 90 engages the cam portion 96 of the shifting bar 97 and causes upward pivotal movement of the pawl, and lifts the jaw portion 93 from the path of the pilot pin so that the pin may pass freely between the pawls during reciprocation of the plunger for forming the next succeeding bale.

From the foregoing it will be apparent that the tier mechanism may be operated at will by the operator for producing bales of various lengths and that the simplicity and automatic functioning of the mechanism will permit increased production of bales from a baling machine with a minimum of labor and operating expense.

What I claim and desire to secure by Letters Patent is:

1. In a baling machine including a baling case and a plunger reciprocable in the case for forming a bale, needle members movable into the case for projecting strands of wire about the end of a bale, tier mechanism including a rotatable member having a slot for receiving the projected strands, means including a rack operable by the plunger for actuating the needles, means operable by the rack for actuating the rotatable member, and means including a cutter on the rotatable member for severing the strands.

2. In a baling machine including a baling case and a plunger reciprocable in the case for forming a bale, needle members movable transversely through the case for projecting strands of wire about the end of a bale, means for actuating the needles including a rack operable by the plunger, a second rack reciprocable in one of said needles, tier means in one of said needles including a gear member operable by the second named rack and having a through radial slot for receiving the projected strands, a cam controlling movement of the gear-operating rack relative to said needle for rotating said gear, and actuator mechanism including a gear operable by the first named rack to move the needles.

3. In a baling machine including a baling case, needle members reciprocable transversely across the case for projecting wire strands about the end of a bale, and transmission mechanism on the case, tier mechanism on one of said needles including a gear member having a slot for receiving the projected strands of wire, a rack on said needle reciprocable by the transmission mechanism and cooperating with the gear member, cam mechanism including pawls on the rack timing movement of the rack relative to the movement of the needles for rotating the gear member and twisting the strands of wire.

4. In a baling machine including a baling case and a plunger reciprocable in the case for forming a bale and having a pilot pin, needle members reciprocable transversely across the case for projecting wire strands about the end of a bale, transmission mechanism on the case including a rack, pawl members on the rack engageable with the pilot pin for operably connecting the needle members with the plunger.

5. In a baling machine including a baling case having a bale chamber and needle members reciprocable in the chamber for tying a bale, coupling mechanism connecting the needle members for effecting simultaneous movement of the needles in opposite directions, actuator mechanism including a rack, a gear unit operable by the rack, a reciprocating member having movement independent of the needle members, a flexible member operably connecting the gear unit with the reciprocating member, means automatically connecting the reciprocating member with one of the needle members to reciprocate the needle members during portions of the travel of the reciprocating member, and tying means associated with the needles operable during the remaining portions of travel of the reciprocating member.

6. In a baling machine including a baling case having a bale chamber, a tier needle at one side of the baling case movable transversely across the bale chamber, tier units on the needle including a gear having a slot for receiving strands of wire surrounding the bale, a tier rack on the needle meshing with the gear, a threader needle at the opposite side of the case movable transversely across the bale chamber for projecting the strands of wire into said slot, actuator mechanism including an actuator rack having pawls, and reciprocating means engageable with the pawls, a cam member engaging the pawls, manually operable means for actuating the cam and controlling connection of the pawls with the reciprocating means, a gear unit operable by the actuator rack, a flexible member connecting the gear unit with the tier rack, cams on the case, and pawls on the tier rack engageable with the tier needle and cooperating with said cams on the case for timing movement of the needle relative to the tier rack.

7. In a baling machine including a baling casing and a tier needle provided with a tier rack movable with reference to the needle, wire twisting means on the needle operable by the rack, and timing mechanism including a cam on the casing, pawls on the tier rack cooperating with the cam for timing movement of the rack relative to movement of the needle for operating the twisting means.

8. In a baling machine including a casing and a pair of needles movable into and out of the casing, means including a bar reciprocable transversely of the casing for moving the needles, a pair of oppositely directed stops on one of the needles, a pair of oppositely directed cams on the casing, and a pair of pawls on said bar alternately engageable with said stops for moving the needles in opposite directions and engageable with said cams for releasing the pawls from the stops.

9. In a baling machine including a casing and a needle movable transversely of the casing actuator mechanism including a guide rail, a slide bar on the rail provided with a cam, pawls pivoted to the rail, means reciprocating in the casing alternately engageable with the pawls for moving the rail in opposite direction, and means on the slide bar including said cam for controlling the pawl.

10. In a baling machine including a tier needle provided with a wire twisting gear, and a rack for rotating the gear, a cutter mounted on the gear and a lug on the rack engageable with the cutter to operate the same.

11. In apparatus of the character described including a reciprocating rack and a gear rotated by the rack and having a slot, a cutter pivotally mounted on the gear to move across the slot, and means effective upon rotation of the gear by the rack for operating the cutter.

12. In apparatus of the character described, a slotted gear, a cutter pivotally mounted on the gear, and movable across the slot therein, means yieldingly restraining the cutter from movement across the slot, and means responsive to rotation of the gear engageable by the cutter upon rotation of the cutter by the gear for operating the cutter.

13. In a baling machine including a casing, a needle movable into and out of the casing, a needle operating member, a flexible member having opposite ends connected to the needle operating member, means for moving the flexible member alternately in opposite directions, means for operably connecting the operating member with the needle during initial movement of the operating member in one direction to move the needle into the housing, and means operably connecting the needle with the operating member when the operating member moves in the opposite direction to withdraw the needle from the housing.

14. In a baling machine including a casing and a wire carrying needle provided with wire twisting means movable into and out of the casing, a needle operating member, a rack on said needle operating member for actuating the twisting means, a flexible member having opposite ends connected to the needle operating member, means for moving the flexible member in opposite directions for reciprocating the needle operating member, and means operably connecting the needle with said needle operating member.

15. In a baling machine including a casing and a wire carrying needle provided with wire tying means movable into and out of the casing, a needle operating member, a rack on said needle operating member for actuating the twisting means, a flexible member having opposite ends connected to the needle actuating member, means for moving the flexible member in opposite directions for reciprocating the needle actuating member, means operably connecting the needle with said needle operating member to move the needle into the housing during initial movement, means disengaging the needle during actuation of the wire tying means, and means connecting the needle with the actuating member upon the return movement of the actuating member to withdraw the needle.

16. In a baling machine including a casing, a plunger movable in the casing, a reciprocatory member selectively operable by the plunger, a needle movable into and out of the casing, a needle operating member, a flexible member having opposite ends connected to the needle operating member, means operable by said rack for moving the flexible member alternately in opposite directions, means for operably connecting the operating member with the needle during the initial movement of the operating member in one direction, and means operably connecting the needle with the operating member when the operating member moves in the opposite direction.

17. In a baling machine including a casing, a wire carrying needle provided with wire twisting means movable into and out of the casing, a reciprocatory needle actuating member, means on the needle actuating member for actuating said twisting means, means for moving the needle actuating member in opposite directions, means operably connecting the needle with the needle actuating member during initial movement of the needle actuating member in one direction, means for effecting disconnection of said needle from the needle actuating member during actuation of said twisting means, and means for connecting the needle with the needle actuating member when the needle actuating member begins movement in the opposite direction.

In testimony whereof I affix my signature.

WILLIS V. HOWARD.